Patented May 17, 1949

2,470,329

UNITED STATES PATENT OFFICE 2,470,329

ASPHALT MOLDING COMPOSITIONS

Raymond A. Barkhuff, Jr., Hazardville, Conn., assignor to Monsanto Chemical Company, St. Louis, Mo., a corporation of Delaware No Drawing. Application January 27, 1948, Serial No. 4,710

3 Claims. (Cl. 260—17.4)

This invention relates to acid resistant resinous compositions. More particularly, the invention relates to a process for providing acid resistant cellulosic fibers for use in conjunction with asphalt molding compositions.

Cellulosic fibers are frequently used as strengthening fillers in asphaltic molding compositions. The molded articles are only partially resistant to acids in spite of the acid resistance of the asphalt itself and their use in contact with acids has been attended by frequent failures due to abnormal deterioration.

It is an object of this invention to provide acid resistant cellulosic fibers for use in conjunction with asphaltic molding compositions.

A further object is to provide acid resistant articles comprising asphalt and cellulosic fibers.

These and other objects are attained by impregnating cellulosic fibers with a copolymer of styrene and maleic anhydride and using the treated fibers in conjunction with asphalt.

The following example is given in illustration and is not intended as a limitation on the scope of this invention.

Example

Wood flour was slurried with an aqueous ammoniacal solution of a styrene-maleic anhydride copolymer containing from about 2 to about 3% solids by weight. The bulk of the water was removed by decantation and the fibers were dried at a temperature of about 200 to 220° F. The resin pickup on the fibers was about 3% by weight based on the weight of the fibers. The treated fibers were thoroughly mixed into an asphalt molding composition and the mixture was molded into a battery box. The acid resistance of the molded battery box was tested by filling it with 30% sulfuric acid and allowing the acid to stand in the box for 50 days at room temperature. At the end of the test no deterioration of the surfaces of the box exposed to the acid could be observed and the flexural strength of the molded composition was unchanged. A similar battery box made from the same asphalt composition admixed with untreated wood flour deteriorated rapidly under the conditions of the acid resistance test and lost nearly 50% of its flexural strength as a result of the test.

The styrene-maleic anhydride copolymers of this invention are made by copolymerizing styrene and maleic anhydride in approximately equimolar proportions in a manner known to the art at temperatures ranging from 50 to 150° C. for from 20 to 40 hours. The copolymers are substantially insoluble in water and acids and are soluble in alkalies and organic solvents.

The aqueous impregnating solutions of styrene-maleic anhydride copolymer are best made using ammonia or a volatile amine as the solubilizing agent. Other alkaline reacting materials such as non-volatile amines, alkali-metal hydroxides, alkaline earth metal hydroxides, etc., may be used. If ammonia or the volatile amines are used, the copolymers may be rendered insoluble on the fibers or webs by merely heating the impregnated material to drive off the solubilizing agent. If the hydroxides or non-volatile amines are used, the copolymer may be precipitated on the cellulosic materials by the addition of acids or salts of polyvalent metals such as calcium chloride, aluminum sulfate, etc., to the impregnating solutions at the end of the impregnating step. If desired, the impregnated material may be removed from the impregnating solution, the excess solution removed by squeeze rolls, doctor blades, etc., and then the impregnated material may be treated with an insolubilizing agent. Alternatively the impregnated material may be used without further treatment as a filler for the asphalt and the insolubilizing may take place when the product molded therefrom is placed in contact with an acid. For example, a battery box might be made from an asphalt admixed with impregnated cellulosic material, the insolubilization of the impregnant being deferred until the battery box was in actual use.

The impregnating solution may conveniently contain from about 1 to about 3% by weight of the styrene-maleic anhydride copolymer. However, variations in the molecular weight of the polymer and in the amount of alkaline agent make it possible to use higher amounts of the copolymer in the impregnating solutions and still obtain efficient treatment of the cellulosic material.

The copolymer solutions may be used to treat cellulosic webs or fibers. In the case of fibers, a slurry of the fibers in the copolymer solution may be prepared. The slurry may then be treated to insolubilize the copolymer on the fibers followed by the removal of water. The treated fibers may then be used to modify asphalt. In another embodiment of this invention the copolymer solutions may be added to an aqueous slurry of cellulosic fibers in a beater and the resin precipitated in the fibers with the salts described above or with acids. The treated fibers may then be made into paper by standard methods providing an acid-resistant paper suitable for use in conjunction with asphalt for laminating purposes.

The copolymers may also be applied to the cellulosic materials from solutions in organic solvents such as alcohols, ketones, esters, etc., and mixtures of the same. The solvent is removed by evaporation, leaving the copolymer deposited on the cellulosic materials.

The cellulosic materials which may be advantageously rendered acid resistant are cotton and paper webs, and cellulosic fibers such as wood flour, alpha flock, walnut-shell flour, macerated fabric, sisal fiber, tire cord, solka flock, cotton linters, etc.

The asphalts which may be used in conjunction with the treated fibers are any of the asphalts derived from natural deposits, petroleum, coal tars, etc., which are solid at normal temperatures. They are frequently used as cheap hard resinous materials in cold molding applications. They may be mixed with the impregnated cellulosic materials by such well known methods as ball milling, roll milling, etc. or they may be heated until fluid and used to impregnate webs and sheets. They are resistant to acids themselves but articles made therefrom lose their acid resistance rapidly when untreated cellulosic fibers are used as strengthening fillers.

The compositions of this invention are advantageous for use in making acid resistant articles and especially for the preparation of battery boxes. Boxes prepared from the compositions are stronger and more shock resistant than boxes made from unfilled asphalt and more acid resistant than boxes made from asphalt filled with untreated cellulosic fibers.

It is obvious that many variations may be made in the process and products of this invention without departing from the spirit and scope thereof as defined in the appended claims.

What is claimed is:

1. An acid resistant molding composition comprising asphalt admixed with a cellulosic fiber impregnated with a copolymer of styrene and maleic anhydride.

2. A battery box molded from a composition comprising asphalt admixed with a cellulosic fiber impregnated with a copolymer of styrene and maleic anhydride.

3. A process which comprises impregnating cellulosic fibers with from 1 to 3% of a styrene-maleic anhydride copolymer and incorporating the impregnated cellulosic fibers into asphalt.

RAYMOND A. BARKHUFF, Jr.

No references cited.